(12) United States Patent
Lucas et al.

(10) Patent No.: US 6,201,528 B1
(45) Date of Patent: Mar. 13, 2001

(54) ANTI-ALIASED INKING FOR PEN COMPUTERS

(75) Inventors: Bruce D. Lucas, Yorktown Heights, NY (US); James Rush Rhyne, II, New Canaan, CT (US); Catherine G. Wolf, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/340,561

(22) Filed: Nov. 16, 1994

(51) Int. Cl.[7] .................................................. G09G 5/36
(52) U.S. Cl. ........................................ 345/136; 345/173
(58) Field of Search .................. 345/179–183, 345/199, 173, 136, 141–144, 147, 114, 16–17, 137, 138, 150, 153; 395/143, 132, 135; 178/18.01, 18.03

(56) References Cited

U.S. PATENT DOCUMENTS

| | | | |
|---|---|---|---|
| 4,736,310 | * | 4/1988 | Culthorpe et al. . |
| 4,796,020 | | 1/1989 | Budrikis et al. ...................... 340/728 |
| 4,931,784 | | 6/1990 | Easterbrook .......................... 340/728 |
| 5,072,076 | * | 12/1991 | Camp, Jr. . |
| 5,241,625 | * | 8/1993 | Epard et al. . |
| 5,276,282 | | 1/1994 | Russell ..................................... 178/19 |
| 5,276,787 | | 1/1994 | Searby ................................... 395/132 |
| 5,283,557 | | 2/1994 | Memarzadeh ........................ 345/132 |
| 5,287,438 | | 2/1994 | Kelleher .............................. 395/132 |
| 5,293,579 | | 3/1994 | Stockholm ............................ 382/22 |
| 5,297,244 | | 3/1994 | Pomichter, Jr. ...................... 395/143 |
| 5,301,269 | | 4/1994 | Alcorn et al. ........................ 395/158 |
| 5,341,152 | * | 8/1994 | Arai et al. ............................ 345/179 |
| 5,347,589 | * | 9/1994 | Meeks et al. ........................ 345/179 |
| 5,347,620 | * | 9/1994 | Zimmer ................................ 345/179 |
| 5,402,151 | * | 3/1995 | Du Waer .............................. 345/179 |
| 5,720,705 | | 1/1988 | Gupta et al. ......................... 340/730 |

FOREIGN PATENT DOCUMENTS 3-41572    2/1991   (JP) .

* cited by examiner

*Primary Examiner*—Kent Chang
(74) *Attorney, Agent, or Firm*—L. Chau & Associates, LLP

(57) ABSTRACT

An anti-aliased inking method and apparatus for pen computers is presented. The invention eliminates aliased imaging of pen strokes by a number of techniques, including a "replace-if-darker" method in the event of overlapping strokes, a "multiplication" method for strokes drawn against backgrounds of various intensities; and a combination of replace-if-darker and multiplication for strokes drawn against colored backgrounds.

17 Claims, 4 Drawing Sheets

ANTI-ALIASED INKING FOR PEN COMPUTERS

FIELD OF THE INVENTION

The present invention relates to pen-based computing systems, and in particular to a method and apparatus for eliminating ink aliasing in such systems.

BACKGROUND OF THE INVENTION

A pen computer is a computer that uses a stylus as a simulated pen for "writing" on the computer screen. The "ink" is simulated by the CPU, drawing the path of the pen on the display. Existing pen computers produce rough, jagged looking ink that considerably impairs their useability.

Recently, a new class of computers that use a pen or stylus as a primary input mechanism has emerged. This class of pen computers includes Personal Digital Assistants (PDAs) and Tablet computers. In a pen computer, the user writes or makes other marks with the stylus on the display screen, typically a Liquid Crystal Display (LCD). Since, of course, actually applying ink to the screen is not practical, such systems are designed to simulate the effect of ink by producing a line on the display that physically coincides with the path of the stylus across the screen. In addition to providing a visible record of what the user has written, the displayed line is valuable feedback to the user to aid in the process of writing. This simulated ink mark is referred to as "inking".

The intent of pen computers is to provide the user with an input mechanism that has the familiarity of pen and paper. Pen computers today and for the foreseeable future, however, have a limitation that causes stylus input to fall considerably short of this goal: the display resolution is far less than the effective resolution of pen and paper. For example, printers typically require a resolution of about 300 pixels per inch or more to produce an image that approaches the sharpness of pen and paper. By contrast, typical LCD displays have a resolution of less than 100 pixels per inch. The visible result of this low resolution is ink that appears rough and jagged. For example, FIG. 1 shows the jagged appearance of the cursive letter "t" as displayed on a typical LCD having low resolution.

The practical consequences of low resolution are: 1) The readability of the user's writing is greatly reduced; 2) The user must write larger to compensate, and therefore can fit less on the screen, effectively reducing the size of the screen; 3) The jagged ink provides false input to the user's visual-motor feedback loop and results in unnecessary motor corrections that reduce the "neatness" of the written input; and 4) the jagged ink reduces the illusion of using pen and paper, reducing the intended familiarity. The result is that users feel less comfortable with the computer.

There is a technique in the computer graphics field for increasing the effective resolution of a computer display, known as "anti-aliasing". In general, anti-aliasing can be applied when drawing a shape of a particular color (the "foreground" color) on a background of another color (the "background" color). In graphics anti-aliasing, pixels with a color intermediate between the foreground color of the shape being drawn and the background color on which the shape is being drawn are used along the edges of the shape to smooth out the edges and reduce their jagged appearance.

This technique can be accomplished by a variety of methods that have been described in the literature. The following simple method is representative of these prior methods. In the prior methods, each pixel is examined, and it is determined what proportion of a particular pixel is covered by the foreground shape, and what proportion of the pixel is covered by the background. Let us call the proportion covered by the background P, which is a number between 0 and 1; then correspondingly, the proportion of the pixel covered by the foreground color will be 1−P, also a number between 0 and 1.

The final color for the pixel is then calculated as a linear blend of the foreground color and the background color, computed independently for each of the red, green, and blue (r, g, and b) components of the colors (collectively, equation (1)).

$$r_{pixel} = (1-P) * r_{foreground} + P * r_{background}$$
$$g_{pixel} = (1-P) * g_{foreground} + P * g_{background} \quad (1)$$
$$b_{pixel} = (1-P) * b_{foreground} + P * b_{background}.$$

In practice, actually computing P according to the proportion of a pixel covered by foreground and background and applying the formula given above for each pixel is too time-consuming, so various equivalent or approximately equivalent methods have been used. For example, for drawing an anti-aliased line, P for a given pixel can be determined from the distance from the line being drawn to the center of the given pixel. This technique of determining the distance from the center of a set of pixels to a line can be done fairly efficiently.

In addition, better results have been obtained by computing a parameter P for use in the linear blending equations given above according to methods that are more complicated than simple coverage of the pixel by foreground and background.

Generally, such methods can be implemented by computing P as a function of the distance from the pixel to the line being drawn. For instance, some methods compute P according to a complex algorithm, such as a weighted average of foreground/background coverage, typically weighted by distance from the pixel center. This can be considered a generalization of the "pixel coverage" algorithm discussed above: the "pixel coverage" algorithm in effect uses a weighted average of foreground/background with a uniform weight throughout the pixel. More generally, the weighting function can be non-uniform, and its non-zero region can extend beyond the pixel boundary. If the weighting function is circularly symmetric, P is purely a function of distance from the pixel center to the line; even if the weighting function isn't circularly symmetric, such as in the case of the uniform one-pixel-square weighting function used in the "pixel coverage" algorithm, taking P to be a function of the distance from the pixel center to the line is a reasonable approximation. This function is often implemented by table lookup. The particular method used to obtain the parameter P does not materially affect the subsequent use of P in the invention to be presented herein.

While anti-aliasing has been applied in computer graphics systems to improve the appearance of text characters and of geometric objects such as lines, circles, and polygons, anti-aliasing has not been used in a computer system to improve the appearance of inking.

In the application of anti-aliasing to inking, there are certain important practical problems that arise, whose completely correct solution is very difficult or impractical, but for which (in accordance with the present invention) good approximate and practical solutions have been developed.

The first problem arises in the solution to the practical problem of reproducing a curved shape that represents a pen stroke, given the periodically sampled pen positions returned by a typical pen and tablet system, and calculating which pixels are near the edge of that curve-shaped stroke and how far they are from its edge. That is, the problem is how to compute the parameter P to be used in the linear blending formula (1).

The theoretically correct solution requires constructing a mathematical description of a curved shape describing the boundaries of a narrow strip following the supposed curve path taken by the stylus, as reconstructed from the periodically sampled stylus positions as returned by the tablet hardware. This solution, however, is too time-consuming for a practical system.

The solution adopted in known non-anti-aliased systems is to treat the pen path as a series of short line segments whose endpoints are the successive sample, or some subset of those samples, returned by the tablet hardware. A similar approach can be adopted in the anti-aliased case, but unlike the non-anti-aliased case, the inventors have determined that special care must be taken as to the treatment of the ends of the line segments in order to avoid apparent gaps between the segments.

The second problem has to do with the practical problem of combining each new line segment as it is produced with the images and graphics already on the screen and with the previous line segments that were drawn. A completely accurate method of anti-aliasing needs to consider for each pixel the geometric relationship of that pixel with each of the objects to be drawn (such as the proportion of that pixel covered by each object) before assigning the pixel a color. In a practical system, objects are drawn on a screen one at a time. For example, the screen may be composed by first drawing a number of windows and other graphical user interface objects. Then, as the user moves the stylus, a number of line segments representing the motion of the stylus will be drawn on the display, one at a time in succession. A practical method is needed for combining the successive anti-aliased line segments with the graphical objects and other anti-aliased line segments that are already on display.

The third problem that arises concerns inking on a color display. The mathematically correct solution for anti-aliased lines involving color is as given above by the linear blending equation (1). However, in a computer system based on a color table, this solution would not be possible to implement because too many different colors would be required to accommodate each of the possible combinations of line color and background color. A practical approximate solution is required.

The foregoing problems are addressed by the present invention.

SUMMARY OF THE INVENTION

The present invention solves the foregoing deficiencies in the prior art by providing an anti-aliasing system and method useful in pen computers.

The invention is method for producing an anti-aliased image on the display of a pen computer comprising the steps of moving a stylus along a desired path on the surface of a digitizing tablet; producing in response to step (a) an electrical signal indicative of the pixel location of the stylus at a given time; and generating an anti-aliased visual display of the path on a display comprising a plurality of pixels.

FIGURES

DETAILED DESCRIPTION

Figure 1:
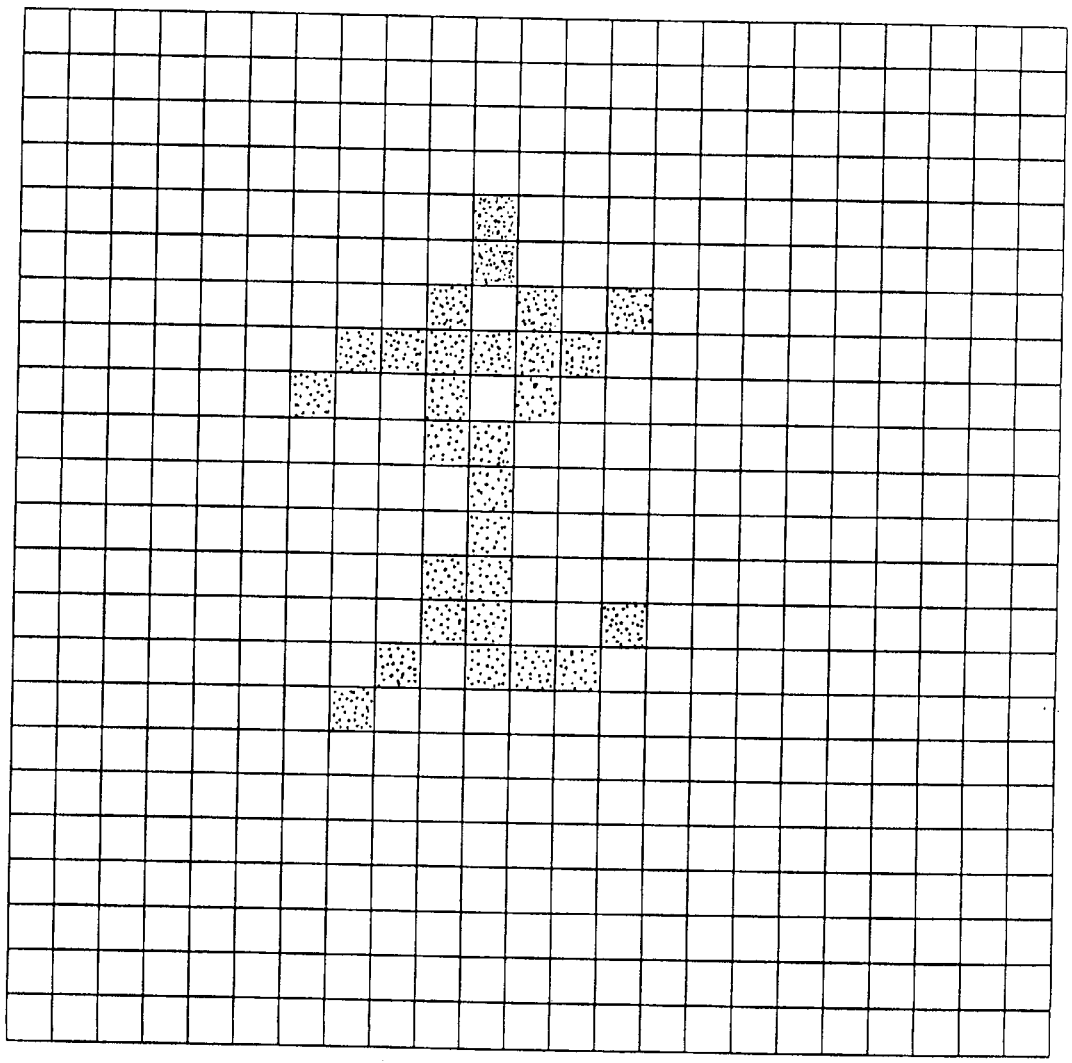
FIG. 1 shows the jagged appearance of inking in prior art systems.
Figure 2:
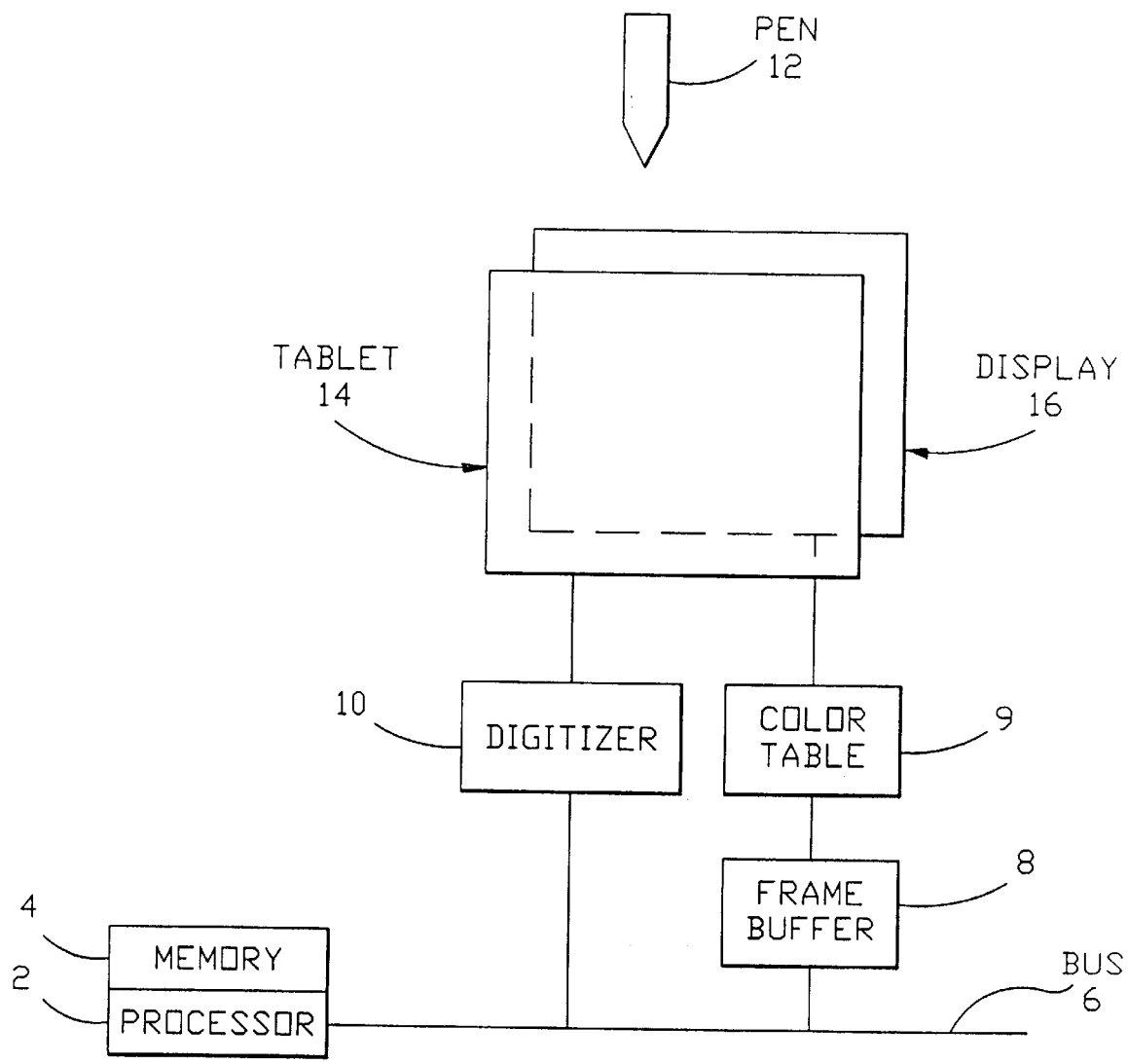
FIG. 2 is a block diagram of a pen computer system in which the present invention can be used.

FIG. 2 shows a block diagram of a preferred system for carrying out the method of the present invention. Shown is a computer system with a processor 2 and memory 4 for storing data and programs. The processor 2 is attached via a bus 6 to a frame buffer 8 and color table 9, a digitizer 10, and other devices (not shown). The function of the digitizer 10 is to measure the position of a pen 12 on a tablet 14 and to relay that position to the processor 2. The tablet 14 is transparent and overlays a display 16, which is driven by the frame buffer 8. As the user writes on the tablet, the position of the pen is measured and transmitted to the processor by the digitizer via the bus, and the processor in turn provides visual feedback to the user by drawing a line or curve in the frame buffer (and therefore on the display) at the positions corresponding to the path of the pen. The color table 9 serves to translate each pixel entry in the frame buffer, which for example might be an integer between 0 and 255, to a color to be displayed for that pixel. This arrangement is used to reduce the amount of storage per pixel from, for instance, three bytes (one each for red, green, and blue) to, for instance, one byte, taken to be an index into the color table.

As discussed above, one problem to be overcome in applying anti-aliasing techniques to pen computing systems is the practical problem of reproducing the curved shape that represents a pen stroke, and calculating which pixels are near the edge of that curved stroke and how far they are from its edge.

Figure 3:
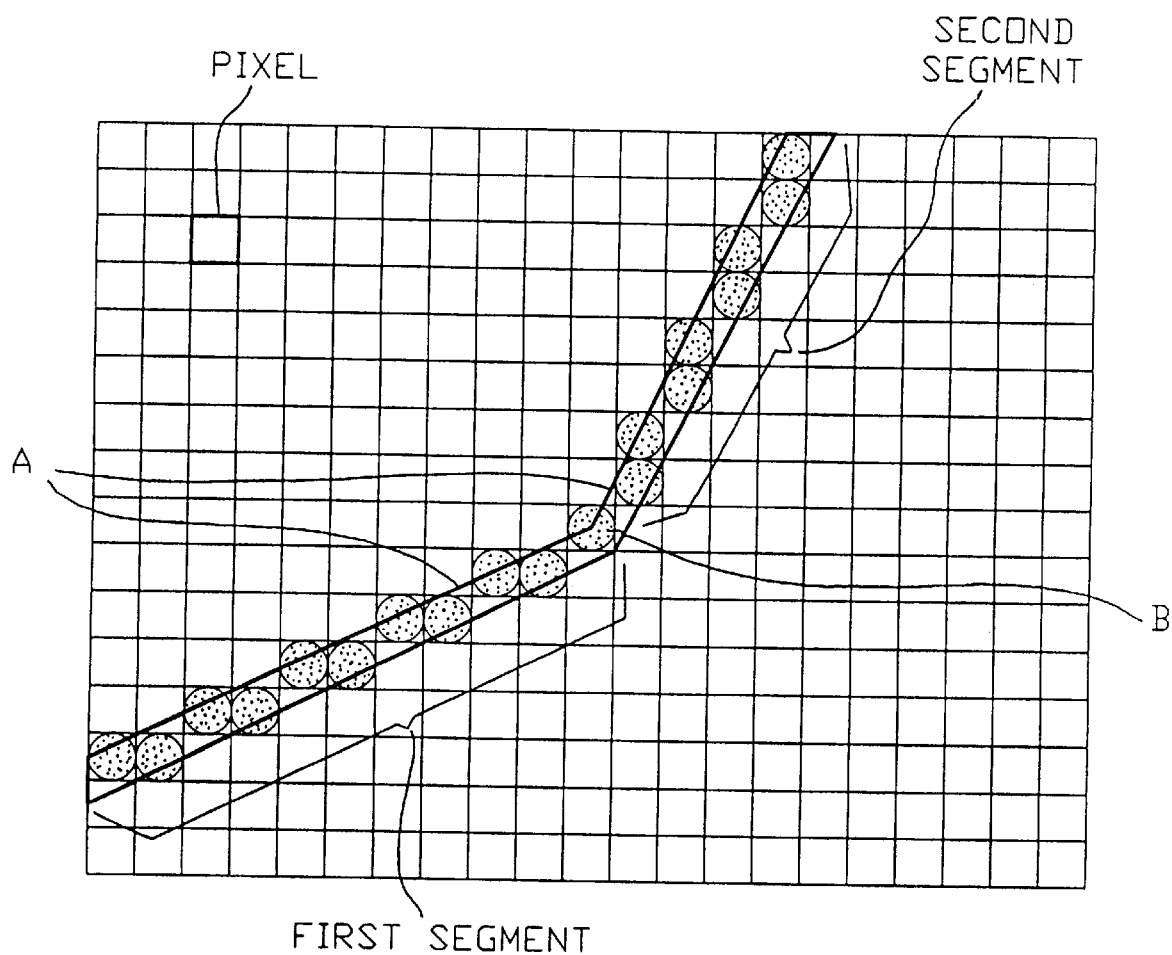
FIG. 3 illustrates how two line segments forming a pen stroke are drawn in a anti-aliased case.

In accordance with the present invention, this problem is solved by decomposing the stroke into a series of line segments with overlapping end pixels. FIG. 3 illustrates two line segments forming a pen stroke drawn in the non-anti-aliased case. The squares represent pixels. The outline A represents the idealized geometric figure of a two-segment stroke that is to be rendered by the pixels indicated by dots. The stroke is drawn as to distinct segments, indicated by "First Segment" and "Second Segment". In the non-anti-aliased case, the pixel in common between the two adjacent pixels, marked B, is drawn as part of only one of the segments.

Figure 4:
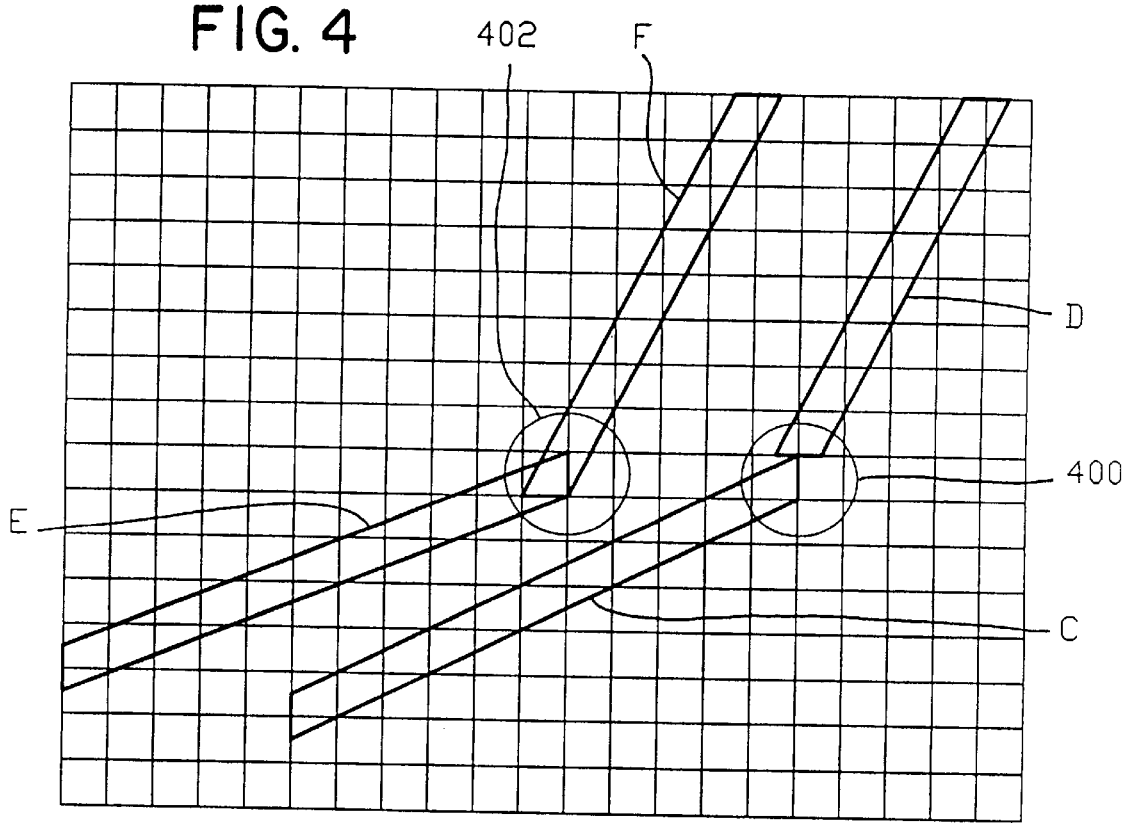
FIG. 4 illustrates the overlap between successive segments of an anti-aliased pen stroke.

While the foregoing segmentation technique has previously been used in the non-anti-aliased inking context, an important additional step, according to the present invention, is necessary for anti-aliased inking. In non-anti-aliased inking, the pixel at which the endpoints of successive line segments meet-up are drawn only once in the process of drawing one of the two line segments that touch that pixel. However, for anti-aliased inking, as shown in FIG. 4, such a technique results in gaps in the inking at points where the tangent to the stroke is at 45 degrees to the horizontal or vertical. An example of such a gap 400 between two segments C and D is shown in FIG. 4. This gapping can be overcome, in accordance with the present invention, by ensuring that a one pixel region of overlap exists between successive line segments.

To accomplish this overlap, it is observed that an anti-aliased line segment is conceptually equivalent to an anti-aliased geometric parallelogram. Two such parallelograms, E and F in FIG. 4, form two line segments that together form a pen stroke. A gap will result if segment B is shortened by one pixel (as in non-anti-aliased inking) so that it does not overlap segment A. Thus, successive segments making up the stroke overlap by one pixel at their lines, as shown in region 402. Thus, the present invention solves the problem associated with non-anti-aliased systems by providing an overlap at the ends of adjoining line segments.

The second problem noted above, that of combining the anti-aliased inking line segments with other graphical objects already on the screen, can be solved in accordance with the present invention by a convenient and visually satisfactory approximation, specifically by treating the graphical objects already on the screen not as graphical objects, but as background against which to draw the anti-aliased inking line segments. The linear blending equation (1) given above is then used, with the color of the anti-aliased inking line segment considered as foreground and the color of the object already on the screen considered as background. The variable P in this equation is determined by the geometric relationship between the anti-aliased inking line segment and the pixel that is being colored, as described above (e.g., in a preferred embodiment, P as a function of pixel coverage). This will be referred to as the "multiplication" method, because for the common case of a black line (i.e., $r_{foreground}=g_{foreground}=b_{foreground}=0$), the linear blending equation given above reduces to $$r_{pixel}=P*r_{background}$$
$$g_{pixel}=P*g_{background}$$
$$b_{pixel}=P*b_{background}$$

and so the combination of the anti-aliased line with the current pixel color on the display is accomplished by multiplication.

Figure 5:
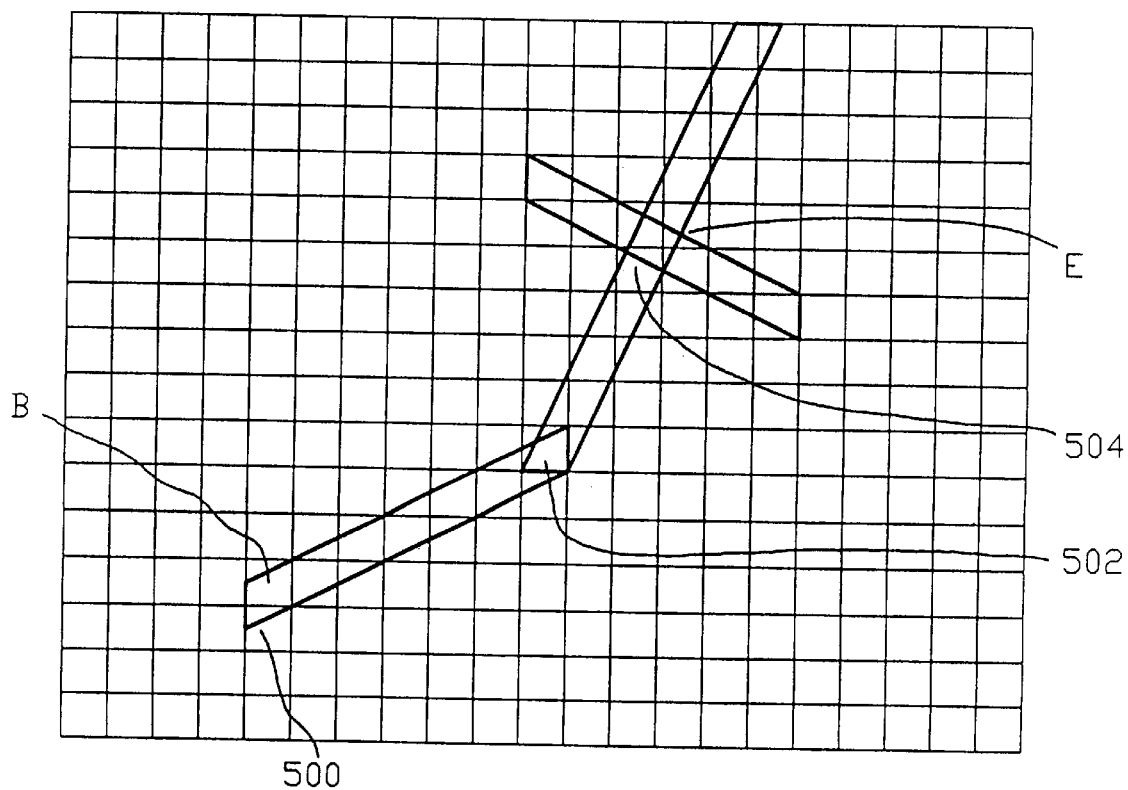
FIG. 5 illustrates overlapping of anti-aliased pen strokes.

However, the "multiplication" method does not work well in places where the inking overlaps itself. This overlapping can occur where the user draws a stroke with the stylus that intersects itself or another stroke (such as where stroke 504 of FIG. 5 is intersected by a second stroke at point E), as well as at the positions where the successive line segments of the ink overlap. Use of the "multiplication" method in such places results in a visible and undesirable darkening line at the points of overlap (such as where stroke B, having ends 500 and 502, overlaps at end 502 with stroke 504). As described above, however, a completely correct mathematical solution to the overlap problem involves performing a detailed geometric analysis of the relationship between the edges of the intersecting lines and the pixels near those intersections. Such a computation is very time-consuming and impractical.

An approximate solution that provides a visually satisfactory result for the predominate case of a dark line against a lighter background is as follows. When drawing an anti-aliased inking line over a line that has already been drawn, for those pixels where overlap occurs, a color is computed according to the linear blending equation (1) given above, but assuming a white background (i.e., $r_{background}=g_{background}=b_{background}=1$) and an arbitrary foreground line color:

$$r=(1-P)*r_{foreground}+P*1$$
$$g=(1-P)*g_{foreground}+P*1$$
$$b=(1-P)*b_{foreground}+P*1.$$

The visual brightness of the resulting computed pixel color is compared against the visual brightness of the pixel color that is already on the display, i.e., the background pixel color. The new computed pixel color is used to replace the current pixel color only if the new computed color is visually darker than the current pixel color. This will be referred to as the "replace-if-darker" method.

An additional problem arises concerning combining the "replace-if-darker" method with the "multiplication" method in the same system. The "replace-if-darker" method must be used when drawing ink that overlaps ink which has already been drawn, but the "multiply" method can not be used in this case, because it will result in periodic dark spots at the places where the successive line segments of a stroke overlap. Conversely, the "multiply" method must be used when drawing ink against a background, and the "replace-if-darker" algorithm cannot be used in this case because it will give the line a "dashed" appearance against any background other than white. This is because the darker the background, the fewer the number of gray pixels that will be drawn at the edge of the anti-aliased line (i.e., the darker background color will remain for those pixels). Because the shading of the pixels in a line varies along the length of the line, such as when the line crosses rows or columns of pixels, the pixels that are not darker than the background also vary. This results in a dashed appearance.

Therefore, it is necessary when drawing an anti-aliased line to be able to determine whether the pixel color that is currently in the frame buffer is the result of a background or other graphics operation, or whether it resulted from drawing anti-aliased ink. For this purpose, in the context of a computer display based on a frame buffer containing indexes to a table of colors, a set of entries is reserved in the color table specifically for the purpose of drawing anti-aliased ink. For example, if 16 gray values are used for anti-aliased ink, then 16 color indexes corresponding to 16 color table entries are reserved for those gray values. Then, during the process of drawing an anti-aliased line, the frame buffer pixel value is examined, pixel by pixel during inking; if the frame buffer pixel is one of the 16 reserved color indexes, the frame buffer pixel is known to have resulted from an inking operation, and so the "replace-if-darker" method is used to obtain a new frame buffer pixel value; on the other hand, if it is not one of the 16 reserved color indexes, the frame buffer pixel value is known to have resulted from a background or other graphics operation, and so the "multiplication" algorithm is used to obtain the new frame buffer pixel value.

Thus, according to the present invention, an appropriate correction technique can be applied depending on the origin of the current contents of the frame buffer pixel.

As mentioned above, a third problem arises in the case of inking against a colored background, wherein the mathematically correct solution for producing anti-aliased lines against a colored background requires using, near the edge separating the line from the background, shades of color that are linear combinations of the (r,g,b) values of the line color and the (r,g,b) values of the background color in accordance with the linear blending equation (1). In other words, colors that smoothly vary from the line color to the background color must be computed. In computer systems based on a color table, however, the mathematically correct solution is computationally impossible to implement because too many different colors are required to accommodate each of the possible combinations of line color and background color, that is, only a limited number of colors may appear simultaneously on a display screen in a system using a table lookup.

Because of limitations in the human visual system, however, humans have difficulty resolving small regions of color, such as the pixels at the boundary between inking and background. Therefore, according to the present invention, in the case of a black or gray line against a colored background, an approximation is used that involves using only shades of gray to draw the anti-aliased line segments. Mathematically, this approximation involves computing an (r,g,b) value that is a linear combination of the line color and the background color in accordance with the linear blending equation (1), but instead of using the actual computed (r,g,b) colors of the anti-aliased line and the background, gray values of comparable line brightness are substituted for the foreground and background pixels, respectively, and an intermediate gray value pixel computed. Because these substituted gray values occupy only a narrow band of pixels (or "border") at the boundary between the stroke and the background, the human eye is unable to determine their actual color, and substitution of a gray of equal brightness has no perceptible effect.

Conceptually, the substitution of a gray value for the mathematically correct intermediate color occurs after application of the linear blending formula given above. However, brightness is reasonably taken to be a linear combination of the red, green, and blue values. For example, a reasonable approximation to brightness is given by:

$$\text{brightness}=0.3*\text{red}+0.6*\text{green}+0.1*\text{blue} \quad (2)$$

From this, it follows that the brightness of a pixel computed in accordance with the linear blending equations given above is given by:

$$\text{brightness}_{pixel}=(1-P)\text{brightness}_{foreground}+P*\text{brightness}_{background}.$$

So, for example, in the case of a black line, this becomes:

$$\text{brightness}_{pixel}=P*\text{brightness}_{background}.$$

Similarly, the brightness, or "intensity", of pixels can be computed using the replace-if-darker method.

The fact that the gray value, or brightness, of the background pixel value can be substituted for the color value before the computation of the combined pixel gray value is carried out has the important practical consequence that table lookup may be used to simplify the computation. Specifically, the brightness given by equation (2) above can be computed by table lookup, based on the color index stored in the frame buffer for the pixel.

Because this is similar to the "multiplication" method described above, using brightness or intensity in place of color values, we will refer to this as the "multiplication-with-intensities" method.

The methods described above can be implemented by use of table lookup in various ways. As a first example, P can be computed by table lookup on the distance of a given pixel from a line, because the distance, as a scaled integer, can be efficiently computed in the process of drawing a line. As a second example, the background pixel brightness can be computed by table lookup on the background pixel frame buffer value, which in a typical system is an index into the color table. As a third example, the final intensity in the "multiplication-with-intensities" method, as given by equation (3) can be computed by table lookup on both the distance of a given pixel from the line, and on the background pixel frame buffer value.

The invention has been implemented in a demonstration version for the current IBM 750P and 710T products, and can be incorporated into a Personal AIX operating system for use on various planned pen-based products without departing from the spirit of the invention.

While the invention has been described particularly with respect to preferred embodiments thereof, it will be understood by those skilled in the art that modifications can be made to make the disclosed embodiments without departing from the spirit and scope of the invention.

We claim:

1. A computer system comprising:

a digitizing tablet;

a display;

a stylus;

means responsive to movement of the stylus across the digitizing tablet for producing an anti-aliased ink image of the path of the stylus on the display.

2. A method for producing an anti-aliased image on the display of a pen computer, comprising:

(a) moving a stylus along a desired path on the surface of a digitizing tablet, the digitizing tablet having a plurality of locations corresponding to pixel locations on an attached display;

(b) producing in response to step (a) an electrical signal indicative of the location of the stylus at a given time;

(c) generating on the display an anti-aliased visual display of the path, the visual display comprising a plurality of pixels, comprising the steps:

displaying as line segments each group of proximately disposed pixels corresponding to locations traversed by the stylus, a plurality of the line segments constituting a representation of the path of the stylus;

displaying each of the line segments on the display such that the ends of adjacent line segments overlap.

3. The method of claim 2, further comprising:

providing a color table having a plurality of indexed color value entries indicative of various colors that can be displayed;

reserving one or more color table entries for representing lines to be drawn on the display;

storing an initial color table index for each background pixel position of the display;

assigning a color value to the line to be produced;

while moving the stylus, comparing the color value of the line with the color value of each pixel location that is traversed by the stylus;

if the color table index value of a pixel traversed by the stylus is one of the reserved color table index values, computing a blended pixel color for that pixel using a replace-if-darker method;

if the color value of a pixel traversed by the stylus is not one of the reserved color values, computing a blended pixel color value using a multiplication method;

assigning a color to the traversed pixel based on the results of the replace-if-darker and multiplication methods.

4. The method of claim 3, wherein the replace-if-darker method comprises:

assuming a fixed background color;

computing the red, green and blue components of a blended pixel value as follows:

$$r_{pixel}=(1-P)*r_{foreground}+P*r$$

$$g_{pixel}=(1-P)*g_{foreground}+P*g$$

$$b_{pixel}=(1-P)*b_{foreground}+P*b;$$

where $r_{foreground}$, $g_{foreground}$ and $b_{foreground}$ represent the red, blue and green color components of the line, and r, g and b represent the red, green and blue color components of the assumed background color, P represents the proportion of the pixel covered by the line, and $r_{pixel}$, $g_{pixel}$ and $b_{pixel}$ represent the red, green and blue components of the blended pixel;

determining the intensity of the blended pixel and the intensity of the actual traversed pixel;

comparing the intensity of each blended pixel color with the intensity of the actual traversed pixel; and replacing each traversed pixel with the blended pixel if the intensity of the blended pixel is less than that of the actual traversed pixel.

5. The method of claim 4, wherein intensity is computed using a linear combination of the color values of the pixel.

6. The method of claim 4, wherein it is assumed that r=b=g=1.

7. The method of claim 3, wherein the multiplication method comprises:

assuming a color for the line;

computing a blended color for each pixel traversed by the stylus as follows:

$$r_{pixel}=(1-P)*r_{foreground}+P*r_{background}$$

$$g_{pixel}=(1-P)*g_{foreground}+P*g_{background}$$

$$b_{pixel}=(1-P)*b_{foreground}+P*b_{background};$$

where $r_{foreground}$, $g_{foreground}$ and $b_{foreground}$ represent the red, green and blue color components of the line, and $r_{background}$, $g_{background}$ and $b_{background}$ represent the red, green and blue color components of the background pixel color, P represents a geometric relationship between the line and the traversed pixel and $r_{pixel}$, $g_{pixel}$ and $b_{pixel}$ represent the blended color of the pixel;

replacing the pixel value of the pixel traversed by the stylus with the blended color.

8. The method of claim 7, wherein the geometric relationship between the line and the pixel is the proportion of the pixel covered by the line.

9. The method of claim 7, wherein it is assumed that $r_{foreground}=b_{foreground}=g_{foreground}=0$.

10. The method of claim 2, further comprising:

producing a border along the length of a line produced by the stylus, the border having an intensity level between the intensities of the background and the line.

11. The method of claim 10, wherein the intensity of the border is computed as follows:

derive from the colors of the line and background pixels a blended intensity level as follows:

assume a fixed intensity value for the background;

for each pixel traversed by the line, let $\text{intensity}_{pixel}=(1-p)*\text{intensity}_{foreground}+P*I$;

where $\text{intensity}_{foreground}$ represents the intensity of the foreground, I equals the assumed value of the intensity of the background, P represents the proportion of the pixel covered by the line, and $\text{intensity}_{pixel}$ represents the resultant intensity of the blended pixel;

determining the intensity of the actual traversed pixel;

comparing the intensity of each blended pixel color with the intensity of the actual traversed pixel; and replacing each traversed pixel with the blended pixel if the intensity of the blended pixel is less than that of the actual traversed pixel.

12. The method of claim 11, further comprising:

producing a border pixel with a gray value with an intensity equal to $\text{intensity}_{pixel}$.

13. The method of claim 11, wherein I=1.

14. The method of claim 10, wherein the intensity of the border color is computed as follows:

derive from the colors of the line and background pixels a blended intensity level as follows:

assume an intensity value for the line;

for each pixel traversed by the line, let:

$\text{intensity}_{pixel}=(1-p)*I+P*\text{intensity}_{background}$, where $\text{intensity}_{background}$ represents the intensity of the background, I equals the assumed line intensity, P represents the proportion of the pixel covered by the line, and $\text{intensity}_{pixel}$ represents the resultant intensity of the border pixel.

15. The method of claim 14, further comprising:

producing a border pixel with a gray value having the computed intensity.

16. The method of claim 14, wherein I=0.

17. A system for producing an anti-aliased image on the display of a pen computer, comprising:

a stylus;

a display;

a digitizing tablet coupled to the display having a plurality of locations corresponding to pixel locations on the display;

means for producing in response to stylus movement across the surface of the digitizing tablet an electrical signal indicative of the location of the stylus at a given time;

means for generating on the display an anti-aliased visual display of the path, the visual display comprising a plurality of pixels.

* * * * *